United States Patent

[11] 3,557,900

| [72] | Inventor | Lauren G. Kilmer |
| | | Tulsa, Okla. |
| [21] | Appl. No. | 766,277 |
| [22] | Filed | Oct. 9, 1968 |
| [45] | Patented | Jan. 26, 1971 |
| [73] | Assignee | Atlantic Richfield Company |
| | | a corporation of Pennsylvania |

[54] GAS EXPLODER WITH COMPRESSIBLE RESILIENT COUPLING STRUCTURE
2 Claims, 1 Drawing Fig.

[52] U.S. Cl. .................................................. 181/0.5
[51] Int. Cl. .................................................. G01v 1/04
[50] Field of Search .......................................... 181/0—5,
(IC, H, EM, EC)

[56] References Cited
UNITED STATES PATENTS

| 3,235,027 | 2/1966 | Kilmer | 181/0.5 |
| 3,363,720 | 1/1968 | Mifsud et al. | 181/0.5 |
| 3,401,770 | 9/1968 | Kilmer et al. | 181/0.5 |

*Primary Examiner*—Rodney D. Bennett, Jr.
*Assistant Examiner*—Daniel C. Kaufman
*Attorney*—McLean, Morton and Boustead

ABSTRACT: An apparatus, which propagates a seismic pulse at a rigid unyielding surface by the explosion of a combustible mixture in a chamber having a rigid bottom and a rigid top resiliently fastened together to permit limited vertical movement therebetween, has a pulse-coupling means comprising a compressible, resilient pad, preferably of molded polyurethane, on said bottom for coupling seismic pulse energy from the rigid bottom to the rigid unyielding surface. Such an apparatus transmits to the rigid unyielding surface a seismic pulse of lower frequency and higher duration than the same apparatus without the compressible, resilient coupling pad.

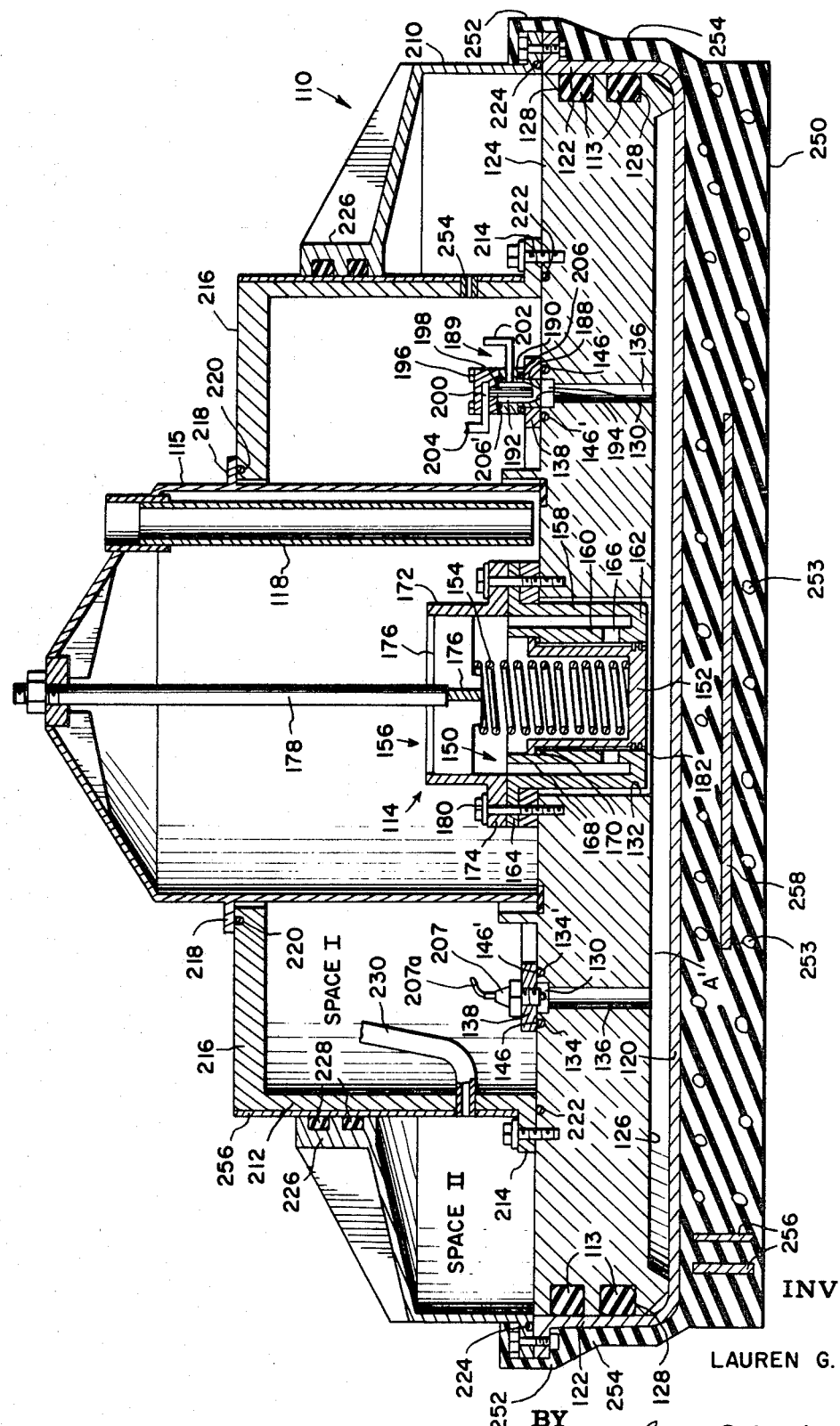

GAS EXPLODER WITH COMPRESSIBLE RESILIENT COUPLING STRUCTURE

This invention relates to seismic prospecting and the generation of seismic waves by gas exploders. More particularly, this invention pertains to a gas exploder-type seismic pulse generator including a pulse coupling means which couples the seismic pulse energy to rigid unyielding surfaces such as ice, frozen ground, rock, concrete, etc., thereby transferring the pulse energy to the rigid surface with increased efficiency.

In many devices for producing a seismic wave for geophysical prospecting heretofore devised it has been the practice to employ a quantity of explosive material such as dynamite which is fired beneath the surface of the earth in predetermined spaced relation with respect to the seismic spread. Such devices possess several disadvantages, such as the necessity for replacement of the explosive cartridge after each shot and the problems incident to establishing a firing circuit to each of the cartridges in successive order whenever another cartridge is to be fired. Such an arrangement is costly in operation, particularly when a large number of shots are to be fired. Furthermore, when the explosive shot emanates from a point source, as is the case with the explosive cartridge arrangement, the efficiency of the generated wave is low for the reason that the rate of change of pressure and the duration of the pressure peak do not correspond to the frequency most favorable to seismic wave propagation. It has been found necessary in the use of these prior devices to employ relatively large quantities of explosives to effect deep penetration of the seismic wave within the geological formation by reason of the undesired frequencies and inefficient character of the wave thus produced.

As described in U.S. Pat. Applications Ser. No. 613,792, filed Feb. 3, 1967, now U.S. Pat. No. 3,401,771 and Ser. No. 544,442, filed Apr. 22, 1966, now U.S. Pat. No. 3,401,769 a gas explosion confined in an expansible chamber acting at the earth-air interface against a large mass positioned above such gas explosion can be utilized to impart a compressive impulse to the surface of the earth beneath the gas explosion, thereby initiating a seismic wave. If the explosion is confined in a device having a rigid top carrying the weight of the large mass and a rigid bottom with vertically extensible sidewalls, the seismic wave generated is useful for seismic prospecting by refraction and reflection techniques, since the impulse imparted to the surface of the earth has a high energy content and can be made of extremely short duration.

As areas of the earth have been explored for oil-bearing formations, efforts have been made to apply the dry land techniques of seismic surveying to operations in land regions covered by rigid unyielding surfaces, for example ice, frozen earth, rock, or concrete. These dry land techniques have not been successfully adapted to such rigid surface operations, however, due to the lack of proper coupling between the seismic exploder and the rigid surface. It has been found, for example, that such dry land techniques are not entirely satisfactory in areas of the far north where the earth's surface is covered by permafrost and ice. If the gas exploder contacts a rigid unyielding surface, such as ice or solidly frozen earth, at the time it is energized, the exploder moves so rapidly that a very brief high-intensity pulse is imparted to the rigid surface. The exploder bottom plate can not move downward against the unyielding rigid surface, and so the large mass of the exploder is lifted upward, thereby dissipating the energy of the explosion rather than imparting that energy to the earth. Often the entire apparatus is lifted off the earth's surface. The short duration pulse which is imparted to the earth is soon dissipated and does not provide seismic reflections.

The present invention is a gas exploder-type seismic signal generator suitable for use on rigid unyielding surfaces and including means for coupling the seismic pulse energy to the rigid unyielding formation. The gas exploder-type signal generator of the present invention comprises a rigid top and a rigid bottom which, when at rest, are so constructed as to form between them a chamber in which a gas explosion can take place. The top and bottom are joined together by an extensible sidewall so that relative vertical movement can take place between them. The bottom is attached to the top with a resilient fastening or spring means which limits the relative vertical movement between the top and bottom and biases the bottom toward the top, so that the volume of the chamber is generally maintained in its original size. Internally of the gas exploder a dynamic seal is provided positioned on the inner side of and adjacent to the clearances at the joint between the top and bottom of the gas exploder. Also, in order that the resilient fastening or spring means which biases the top and bottom of the exploder together be not overly strained, a valving arrangement is employed to release the force of the exploded gas simultaneously as relative movement between the top and bottom of the exploder occurs. This is also desirable particularly where several explosions are required at a given location.

A pulse coupler is provided which fits snugly around the exploder bottom. The exploder bottom plate moves against this pulse coupler to transmit to the rigid unyielding surface a seismic pulse of lower frequency and longer duration than would be provided if the rigid bottom were directly contacting the rigid unyielding surface.

For a more complete understanding of the practical application of this invention, reference is made to the appended drawings which is a vertical sectional view of a gas exploder with attached pulse-coupling means in accordance with this invention.

As illustrated in the drawing, the exploder in accordance with this invention basically includes a top 110, a bottom 112, sealing rings 113, an exhaust valve 114, and an exhaust stack 115. Top 110 includes an annular, thick steel plate 124 having an outside diameter slightly smaller than the inside diameter of the flange 122 on bottom 112 and is further provided with a depressed portion 126 in the bottom thereof as well as grooves 128 in the side thereof which contain sealing rings 113. The depressed portion 126 of plate 124 cooperates with bottom plate 120 of bottom 112 to form the detonation chamber A' of the exploder. Plate 124 also has an annular groove 130 in its upper surface between its outer rim and a central opening 132. Two smaller annular grooves 134 and 134' can be arranged, if desired, in plate 124 on opposite sides of groove 130 for O-rings 146 and 146', respectively, which seal groove 130. Groove 130 is connected to the chamber A' by two small, vertical openings 136 disposed at substantially 180° relative to each other about central opening 132. Plate 124 carries substantially coaxially positioned, generally annular upper ring 138 which is attached to the top side of plate 124 and covers groove 130 to form therewith an annular passage.

Valve 114 includes a valve body 150, a piston or valve element 152, a helical spring 154 and a spring retainer cage 156. Generally, valve body 150 includes a pair of coaxial cylindrical walls 158 and 160, which are spaced from each other, are closed together at their lower ends by means of an interconnecting annular end wall 162 and are open at their upper ends. The outer sidewall 158 at its upper end is provided with an outwardly extending annular flange 164 and itself has a diameter just less than that of opening 132 such that valve body 150 can be positioned in opening 132 with flange 164 overlying the top of plate 124. Inner wall 160 has a machined inside surface which is countersunk at its upper end and which is provided with a series of apertures 166 adjacent its lower end providing communication between the annular space between walls 158 and 160 and the central opening of valve body 150 lying inside wall 160. Piston 152 which is a machined casting sized to fit snugly but slidingly within cylindrical wall 160 has a flange 168 at its upper end received in the counter bore in the upper end of the interior of wall 160 to limit downward movement of piston 152 at a position in which the lower, closed end seals openings 166 in wall 160. An O-ring 170 cushions flange 168 at the counter bore surface. Piston rings 182 seal the piston 152 at its lower end.

Spring cage 156 includes a short steel cylinder 172 which has a pair of intersecting steel cross plates 176 in its upper interior portion forming a spider to which is secured a cylindrical rod element 178. The cylinder portion 172 of spring cage 156 is positioned above valve body 150 with flange 174 overlying flange 164, and spring cage 156 and valve body 150 are retained in such position by a series of cap bolts 180 received in apertures in flanges 164 and 174 which register with correspondingly disposed tapped bores arranged about opening 132 in plate 124 such that helical spring 154 is retained snugly under compression between the underside of spider 176 and the upperside of the closed bottom of piston 152. The spacing of the flights of spring 154 in this position and the length of piston 152 in relation to the location of spider 176 is such that when piston 152 is displaced upwardly to the maximum compression of spring 154, apertures 166 in sidewall 160 are completely exposed to connect the chamber A' with the annular space between walls 158 and 160 of valve body 150 and hence with the exterior of the exploder through spring cage 156 and exhaust pipe 118. Pipe 118 can be connected through muffler 115 to provide low-pass characteristics desirably having an upper cutoff frequency on the order of five cycles per second.

The gas-charging system basically includes a mixing valve 189 interconnected to groove 130. The mixing valve comprises a member 190 inserted into aperture 188 in ring 138. Member 190 has a central passage 192 and a tapered conical opening 194 which faces groove 130. A top valve member 196 carries a depending tube 198 which is inserted into passage 192 and opening 194 so that the spacing of the passage through opening 192 is controlled by the location of tube 198. A passage 200 extends through tube 198 and member 196. Separate connections 202 and 204, preferably valved, leading to storage cylinders respectively for propylene, or other suitable fuel gas, and oxygen are connected, respectively, to passages 192 and 200. Two O-rings 206 and 206' seal member 190 to ring 138 and member 196, respectively. The ignition system includes spark plugs, such as spark plug 207, arranged in apertures in ring 138 on either side of the mixing valve to extend through ring 138 and communicate with groove 130. Exteriorly the spark plugs thus mounted are electrically connected via leads, such as lead 207a, to a suitable electrical supply (not shown). It is also apparent that other types of gas manifolds, ignition systems, and valves can be used, if desired.

An air cushion formed between upwardly extending members 210 and 212 resiliently fastens bottom 112 to top 110. Member 212 is bolted to top member 124 at flange 214 and includes an upper flange 216 which engages flange 218 on muffler 115. Flange 216 is sealed at flange 218 by O-ring 220, and flange 214 is sealed at top member 124 by O-ring 222 to form between member 212 and muffler 115 an air space I. Member 210 is bolted at flange 224 to the flange 122 of bottom 112. Member 210 extends upwardly and inwardly toward member 212 to slidingly engage member 212. Member 210 engages member 212 at an enlarged portion 226 and is sealed thereat by O-ring 228 to form an air space II. Member 212 can be sheathed in a metal 256, e.g. monel metal, for protection against sea water, if desired. Space II is normally filled with air under pressure, e.g. about 15 to 20 p.s.i.g. by means of a hose 230 which extends through the flange 216 (not shown). The air pressure in space II bleeds through bleed valve 254 at a reduced rate from space II into space I which, accordingly, serves as a plenum chamber for the air filled spring. Space I is used to house the various hose connections 202 and 204 for the gas-charging system, the mixing valve, and the ignition spark plugs 207, hose 230, etc., and the pressure in space I serves to keep water out.

A pulse-coupling pad 250 is attached to bottom plate 120, for example by means of a molded attachment ring 252. Pad 250 is formed of a tough compressible, yet resilient, high-strength material such as a molded polyurethane incorporating numerous air bubbles 253 or molded voids and openings. Pad 250 fits snugly against bottom plate 120 to move therewith. The sidewall 254 connecting pad 250 to attachment ring 252 is sufficiently resilient to permit attachment of ring 252 over flange 224. If desired, means such as rigid vertical transmission members 256 or rigid horizontal transmission member 258 can be incorporated into coupling shroud 250 to further enhance the pulse transmission characteristics of the apparatus. Rigid members 256 and 258 might be steel rods, tubes, or plates, by way of examples. Alternatively pad 250 can be formed in layers of different density or hardness to provide the desired frequency coupling characteristics.

In operation the gas exploder is located at a suitable location with the bottom of the pad 250 resting on the rigid unyielding surface of the earth such as on rock, concrete, ice or frozen earth such as that encountered in arctic and semiarctic regions. Typically the force of spring 154 is sufficient such that operation of piston 152 does not occur until a pressure within exploder chamber A' on the order of 30 p.s.i.g. has been reached. Conduits 202 and 204 introduce propylene and oxygen until a pressure in exploder chamber A' on the order of 2 p.s.i.g. has been achieved. It will be apparent that a stoichiometric mixture of oxygen and propylene is sought and that this is achieved quite simply by introducing the gases such that the partial pressures of each are in proportion to the molar ratio of a stoichiometric mixture, i.e., $4.5:1::O_2:C_3H_6$. The mixing valve 189 insures adequate mixing of the gases. The pressure in space II is adjusted by introducing air through conduit 230 to provide a pressure sufficient to hold the bottom 120 and top 110 together and return them after an explosion. Spark plug 207 is energized to detonate the gas mixture in chamber A'. Upon explosion of the gases, the initial force of the explosion is directed against bottom 120 due to the larger mass of top 110 to create the seismic wave of interest. Since bottom 120 is resting on resilient pad 250, bottom 120 is enabled to move downwardly relative to top 110. As a result the seismic pulse transmitted into the earth through the rigid unyielding surface has frequency and duration characteristics which increase the value of the pulse for seismic prospecting work. Thus, the pulse generated with the gas exploder including pulse coupling pad 250 is of a lower frequency and longer duration than would be the pulse which would be generated with bottom plate 120 directly contacting the rigid unyielding surface. The continued expansion of the exploding gases drives the bottom 120 downwardly relative to top 110, since bottom 120 is relatively considerably lighter than top 110, tending to compress the air spring formed by space II. At such time the pressure of the exploding gases forces sealing ring 113 tightly against the joint formed between the flange 122 and top body 124, generally deforming ring 113 against such joint. At the same time as relative movement of the bottom 120 and top 110 occurs, however, piston 152 is lifted at an even faster rate to vent chamber A' through valve 114 and muffler 115. This venting action is so rapid that normally the pressure is relieved within a fraction of a second, and generally after such venting, the pressure of unvented combustion gases remaining between top 110 and bottom 120 is substantially negative to atmospheric, being on the order of 5 p.s.i.a. As a result, it is usually unnecessary in subsequent firing to purge the interior of the gas exploder when recharging, and recharging can be so fast that repetitive firing at significantly rapid rates is feasible. After an explosion, top 110 and bottom 120 are biased toward their closed position by the air pressure within space II as well as the forces applied by the weight of top 110. Closure of valve 114 through the action of spring 154 is timed to provide for exhaust of chamber A'.

I claim:

1. In an apparatus for propagating a seismic pulse at a rigid unyielding surface by the explosion of a combustible mixture in a chamber having a rigid bottom and a rigid top resiliently fastened together to permit limited vertical movement therebetween, the improvement of a pulse coupling means comprising a compressible, resilient pad snugly attached beneath said rigid bottom and including a plurality of voids to provide increased compressibility.

2. The improvement of claim 1 in which said compressible, resilient pad includes at least one rigid transmission member.